Feb. 25, 1969    A. M. McINTOSH    3,429,144
CENTER BEARING DOUBLE CARDAN JOINT
Filed Aug. 17, 1967

INVENTOR
ARTHUR M. McINTOSH
BY F. A. Husemark
ATTORNEY

United States Patent Office 3,429,144
Patented Feb. 25, 1969

3,429,144
CENTER BEARING DOUBLE CARDAN JOINT
Arthur M. McIntosh, Arlington Heights, Ill., assignor to Borg-Warner Corporation, Chicago, Ill., a corporation of Illinois
Filed Aug. 17, 1967, Ser. No. 661,346
U.S. Cl. 64—17                                    7 Claims
Int. Cl. F16d 3/26, 3/30

ABSTRACT OF THE DISCLOSURE

A double cardan joint provided with a floating bearing positioned between two yoke members of the joint for maintaining their alignment.

BACKGROUND OF THE INVENTION

Field of the invention

This invention resides in the field of double cardan joints and more particularly to double cardan joints provided with a bearing as a centering means.

Description of the prior art

French Patent 793,629 appears to be closest prior art. It comprises a double cardan joint provided with a ball operable in a pair of sockets as a centering means. External springs associated with one of the axially movable yokes and a sliding spline serve to urge one of the sockets against the ball whereby the ball is operably confined within the two sockets thus serving as the centering means for the joint.

Another reference, the Stokely Patent No. 2,986,022, shows a centering means comprising a spherical cam or male element, fixed to one of the yokes, which has theoretical point contact only with the inner surface of a fixed conical socket in which it is carried.

A further reference, Mazziotti, Patent No. 2,988,904, shows a double cardan joint having a ball and socket center bearing located a fixed distance from the center of one spider, which causes the center of the ball to move in an arc during change of shaft angles. Needles are used to support the ball and to allow axial sliding to compensate for positional changes during articulation. Loads are taken on cantilevered ball supported in one yoke.

In the present invention, a ball operable in a pair of sockets also serve as a centering means thereby maintaining the alignment of two yoke members of the double cardan joint. When changes in the angularity of the shafts occur during operation, the centers of the two spiders remain fixed with respect to the ball which therefore moves in a vertical plane centered between the two spiders as compared with the French patent wherein the centers of the two spiders with respect to the ball are not fixed. As the angularity between the input and output shafts changes, one spider must be moved axially by the external springs working through a sliding spline to maintain center bearing contact, and this increases the variables of the system as compared with the present invention in which the variables are of a lesser degree, because the spider centers are fixed with respect to the ball and therefore provide better stability.

The present invention distinguishes from the Stokely patent, in that a floating ball is used as a center bearing which provides a large area of continuously changing contact with the inner surfaces of the sockets in which it is carried, as compared with the Stokely patent, wherein the cam of the centering means, has theoretical point contact only with the inner surface of the fixed conical socket and therefore, because the present invention has a greater surface area exposed to wear, manifestly longer life is indicated.

Structurally, the Mazziotti patent, is more complicated than the present invention and the centering means manifestly is quite different.

In a modified form of the present invention less expensive conically shaped sockets are provided for low power applications. Although this would result in theoretical line contact (circle) with respect to the ball and the sockets, it should be borne in mind that the ball and sockets are free to rotate and change position, therefore, no fixed contact with respect to the ball would occur and therefore it should provide adequate wear life for these applications.

SUMMARY OF THE INVENTION

A preferred embodiment of the present invention comprises a pair of yokes each having oppositely disposed arms with cylindrical openings in their ends. Each of said pair of arms having a spider operably mounted in the cylindrical openings in trunnions. A link yoke having oppositely disposed ears are provided with cylindrical openings therein, which are in operable engagement with their respective trunnions of the spiders. Each of the yokes is provided with an axially disposed recess carrying a spherical socket and having a Belleville spring or other loading member interposed therebetween. A ball held captive within the sockets serves as a centering means for the double cardan joint.

This invention consists of the novel constructions, arrangements and devices to be hereinafter more fully described and claimed for carrying out the novel features of the present invention as will be apparent from the following description of a preferred form of this invention, illustrated with reference to the accompanying drawing, wherein:

Figure 1:
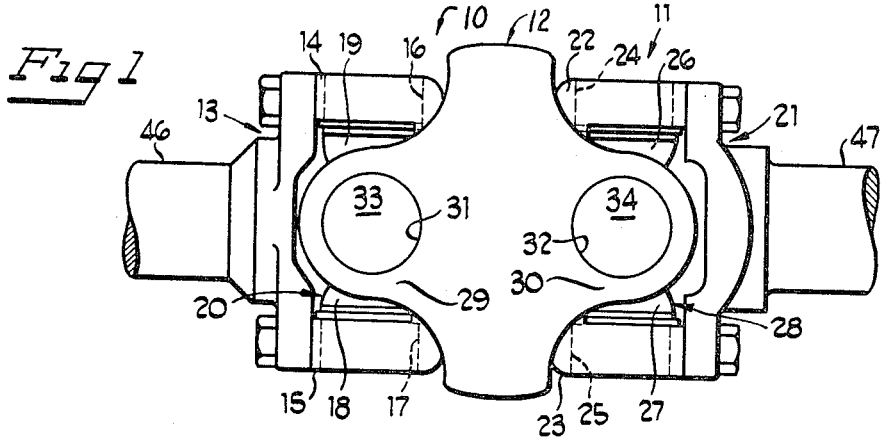
FIGURE 1 is a longitudinal plan view of a double cardan joint, embodying the present invention.

Referring to the drawing there is disclosed in FIGURE 1, a pair of cardan joints 10 and 11, operably connected to by a link yoke 12.

The cardan joint 10, comprises a yoke 13, having oppositely disposed arms 14 and 15, provided with cylindrical openings 16 and 17, for receiving a pair of opposed trunnions 18 and 19 of a spider 20.

The cardan joint 11, comprises a yoke 21, having oppositely disposed arms 22 and 23, provided with cylindrical openings 24 and 25 for receiving a pair of opposed trunnions 26 and 27 of a spider 28.

The link yoke 12 is provided with a first pair of oppositely disposed ears 29 and 30 respectively, provided with a pair of cylindrical openings 31 and 32, respectively, for receiving a trunnion 33, of the spider 20, and a trunnion 34 of the spider 28, respectively.

A second pair of oppositely disposed ears (not shown), provided with cylindrical openings for receiving trunnions (not shown), oppositely disposed with respect to the trunnion 33, of the spider 20 and the trunnion 34 of the spider 28, respectively. Suitable bearings not shown are provided for the trunnions.

Torque transmitting shafts 46 and 47 are connected to their respective yokes 13 and 21.

Figure 2:
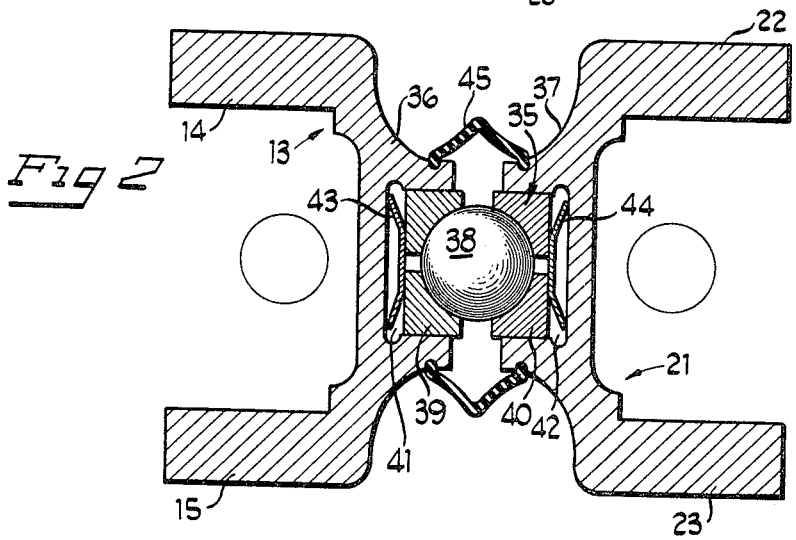
FIGURE 2 is an enlarged sectional view, showing in detail the centering device disposed between a pair of yokes.

A centering device 35, FIGURE 2, disposed between the inner ends 36 and 37, of the yokes 13 and 21, respectively, comprises a floating ball 38, disposed between a pair of spherical sockets 39 and 40, which, are in axial alignment with the transmitting shafts 46 and 47, respectively, and are slidably fitted in pockets 41 and 42, respectively. Belleville springs 43 and 44 are disposed in the pockets 41 and 42, respectively, urging sockets 39 and 40 against the floating ball 38, which maintains the alignment of the yokes 13 and 21.

A flexible dust boot 45 is suitably attached to the periphery of the inner ends 36 and 37.

Figure 3:
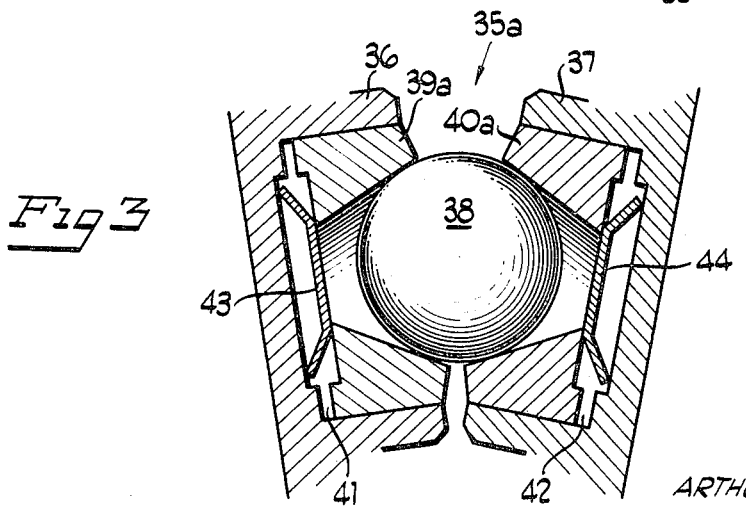
FIGURE 3 is an enlarged cross sectional view of the centering device showing optional conical sockets.

A modified centering device 35a is shown in FIGURE 3, which comprises the floating ball 38, held captive between a pair of conical sockets 39a and 40a.

From the foregoing description, taken in conjunction with the drawing, it can be seen that there has been provided a floating ball, disposed between a pair of sockets serving as a centering device for a double cardan universal joint. The floating ball provides a large area of continuously changing contact with the inner surface of the sockets in which it is carried, whereby wear is reduced to a minimum.

With respect to the modified form shown in FIGURE 3, conical shaped sockets are used instead of spherical sockets. Conical sockets are less expensive than spherical sockets, but would have less area of continuously changing contact with the inner surface of the sockets and theoretically may be considered a line contact. It should be borne in mind that the sockets and floating ball are free to rotate and change position, which would enhance their life as compared with a fixed ball type member.

While this invention has been described in connection with certain specific embodiments thereof, it is to be understood that this is by way of illustration and not by way of limitation and the scope of this invention is defined solely by the appended claims which should be construed as broadly as the prior art will permit.

I claim:

1. In a double cardan universal joint comprising in combination:
   (A) a first yoke connected to a first torque transmitting shaft having a first pair of oppositely disposed arms, each provided with a cylindrical opening;
   (B) a second yoke conected to a second torque transmitting shaft having a second pair of oppositely disposed arms, each provided with a cylindrical opening;
   (C) a first socket means axially disposed in an inner yoke end of said first yoke;
   (D) a second socket means axially disposed in an inner yoke end of said second yoke;
   (E) a first spider having first and second opposed trunnions, which are in operable engagement with the said cylindrical openings in the said first pair of oppositely disposed arms;
   (F) a second spider having third and fourth opposed trunnions, which are in operable engagement with the said cylindrical openings in the said second pair of the oppositely disposed arms;
   (G) a floating ball disposed within the said first and second sockets;
   (H) a link yoke provided with first and second pairs of oppositely disposed ears having first and second pairs of cylindrical openings therein which are in operable engagement with the said second and fourth pairs of opposed trunnions, respectively, whereby the said first and second spiders are interconnected to complete the assembly of the said cardan joint.

2. In a double cardan universal joint according to claim 1, wherein the said sockets are contoured spherically in their inner surfaces.

3. In a double cardan universal joint according to claim 1, wherein the said sockets are contoured conically in their inner surfaces.

4. In a double cardan universal joint according to claim 1, wherein the first and second yokes are provided with axially disposed pockets therein for receiving the said first and second sockets respectively.

5. In a double cardan universal joint according to claim 4, wherein at least one flexible means is provided in one of the said pockets for urging the said socket therein against the said floating ball.

6. In a double cardan universal joint according to claim 4, wherein the said axially disposed pockets are cylindrical.

7. In a double cardan universal joint according to claim 1, wherein a flexible dust boot is disposed over the peripheries of the inner yoke ends of the said first and second yokes.

References Cited

UNITED STATES PATENTS

| 2,986,022 | 5/1961 | Stokely | 64—21 |
| 2,988,904 | 6/1961 | Mazziotti | 64—21 |

FOREIGN PATENTS

| 567,101 | 5/1958 | Belgium. |
| 793,629 | 11/1935 | France. |

HALL C. COE, *Primary Examiner.*

U.S. Cl. X.R.

64—21